US009274785B2

(12) United States Patent
Jung

(10) Patent No.: US 9,274,785 B2
(45) Date of Patent: Mar. 1, 2016

(54) METHOD OF UPDATING SOFTWARE FOR VEHICLE

(71) Applicant: Hyundai Motor Company, Seoul (KR)

(72) Inventor: Jae Hoon Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/477,066

(22) Filed: Sep. 4, 2014

(65) Prior Publication Data

US 2015/0220321 A1 Aug. 6, 2015

(30) Foreign Application Priority Data

Feb. 6, 2014 (KR) ........................ 10-2014-0013470

(51) Int. Cl.
G06F 9/44 (2006.01)
G06F 9/445 (2006.01)
H04L 29/08 (2006.01)

(52) U.S. Cl.
CPC . *G06F 8/65* (2013.01); *H04L 67/12* (2013.01)

(58) Field of Classification Search
CPC .................................. G06F 8/65; H04L 67/12
USPC .................................. 717/168–178; 701/450
See application file for complete search history.

(56) References Cited

U.S. PATENT DOCUMENTS

| 7,027,772 | B2 * | 4/2006 | Chen et al. ................... 455/41.1 |
| 7,506,309 | B2 * | 3/2009 | Schaefer ....................... 717/120 |
| 7,693,612 | B2 * | 4/2010 | Bauchot et al. .................... 701/1 |
| 7,957,849 | B2 * | 6/2011 | Reichart et al. ................... 701/1 |
| 7,966,111 | B2 * | 6/2011 | Moinzadeh et al. ......... 701/29.6 |
| 8,725,135 | B2 * | 5/2014 | Weyl et al. ..................... 455/420 |
| 2004/0082350 | A1 * | 4/2004 | Chen et al. ..................... 455/518 |
| 2005/0216903 | A1 * | 9/2005 | Schaefer ........................ 717/168 |
| 2006/0294514 | A1 * | 12/2006 | Bauchot et al. ............... 717/173 |
| 2007/0287439 | A1 * | 12/2007 | Weyl et al. ..................... 455/420 |
| 2008/0007120 | A1 * | 1/2008 | Weyl et al. .................... 307/10.1 |
| 2009/0037701 | A1 * | 2/2009 | Reichart et al. ............... 712/225 |
| 2011/0093846 | A1 * | 4/2011 | Moinzadeh et al. .......... 717/178 |
| 2011/0307882 | A1 * | 12/2011 | Shiba ............................. 717/173 |

FOREIGN PATENT DOCUMENTS

| JP | 2007318353 A | 12/2007 |
| JP | 2008-523744 A | 7/2008 |
| JP | 2009239797 A | 10/2009 |
| KR | 10-2003-0097204 | 12/2003 |
| KR | 10-2007-0021542 A | 2/2007 |
| KR | 10-2010-0102927 | 9/2010 |
| KR | 10-2011-0026637 A | 3/2011 |
| KR | 10-2012-0062539 A | 6/2012 |

OTHER PUBLICATIONS

Joe, "Can You Get Paid to Drive? Review of paidride.com," <http://www.ivetriedthat.com/2008/06/06/can-you-get-paid-to-drive-review-of-paidridecom/>, Jun. 6, 2008, p. 1-15.*

* cited by examiner

*Primary Examiner* — Qing Chen
(74) *Attorney, Agent, or Firm* — Mintz Levin Cohn Ferris Glovsky and Popeo, P.C.; Peter F. Corless

(57) ABSTRACT

Disclosed is a method of updating software for a vehicle. The method includes determining whether a vehicle terminal of the vehicle is running out-of-date software; selecting a target vehicle among neighboring vehicles via wireless communication, wherein the target vehicle is running updated software; receiving a shared update file from the target vehicle via wireless communication, the shared update file based on the updated software; storing the shared update file; and updating the out-of-date software using the shared updated file.

13 Claims, 3 Drawing Sheets

METHOD OF UPDATING SOFTWARE FOR VEHICLE

CROSS-REFERENCE TO RELATED APPLICATION

This application claims under 35 U.S.C. §119(a) priority to and the benefit of Korean Patent Application No. 10-2014-0013470 filed on Feb. 6, 2014, the entire contents of which are incorporated herein by reference.

BACKGROUND (a) Technical Field

The present disclosure relates to a method of updating software for a vehicle. More particularly, it relates to a method capable of easily updating software of a telematics unit or a navigation device in a vehicle.

(b) Background Art

Telematics, which is a compound of "telecommunication" and "informatics", refers commonly to a technique of transmitting, receiving and storing various kinds of information using location information and a wireless communication network. Recently, telematics have been implemented by integrating a navigation system using GPS (Global Positioning System) techniques with a mobile communication system and then applying the integrated system to a vehicle. For example, by integrating a GPS and a GIS (Geographic Information System) in a vehicle, the driver may be guided or informed of traffic information in real time through a telematics unit, a mobile telephone, a smart phone, PDA (Personal Digital Assistant), or the like, in the vehicle.

In addition, telematics systems (or TMS (Telematics Management System)) have been used in various fields in connection with a GPS, mobile communication, and the Internet, such as a fault diagnosis of electrical/mechanical components installed in a vehicle, a remote vehicle diagnosis using information on the state of a vehicle, vehicle control, a vehicle accident or theft occurrence sensing, communication between a telematics center and a vehicle or vehicles, an intelligent traffic system, an emergency rescue service, Internet, multimedia service for providing a moving picture, movies or a game, or an interface between human and a vehicle. For example, the information on the state of a vehicle includes a vehicle error code obtained through an electronic control device in a vehicle, a vehicle speed, engine RPM, coolant temperature, data collected through various kinds of sensors in a vehicle, and the like.

The telematics unit of a vehicle can collect such information on a vehicle state and transmit the information to a telematics center. A server of the telematics center, which receives the information from the telematics unit, can provide service information obtained through a sequence of processes of processing information to the telematics unit of the vehicle. For example, when trouble or an accident occurs in a vehicle, the telematics unit transmits the diagnosed vehicle state information, the location information, and information on an image photographed through a camera to the server of the telematics center, and receives accident countermeasure information, emergency rescue service, and road traffic situation information service from the server of the telematics center.

Meanwhile, in order to update software of a vehicle terminal, such as navigation software of a navigation device, an update file is typically downloaded using a PC onto a storage medium, such as a USB memory or an SD card. To this end, the PC should be plugged-in to the navigation terminal in order to update the software of the navigation terminal. Problematically, this requires cumbersome work including accessing the server that provides an update file, downloading the update file to the USB memory or SD card, and connecting the USB memory or SD card to the vehicle terminal. In addition, the software update operation can be performed in a PC-access environment to download the update file.

Thus, there are many cases that the driver of a vehicle does not update the software of a vehicle at the proper time due to the inconveniences described above, and thus the previous version software is continuously used, although an update is available, such that exact information, in the case of a navigation system, is not provided to the driver.

SUMMARY OF THE DISCLOSURE

Accordingly, the disclosed embodiments have been made in an effort to solve the above-mentioned problems, and it is an object of the present disclosure to provide a method of easily updating software of a terminal for a telematics unit or a navigation device in a vehicle.

There is provided a method of updating software for a vehicle, the method including determining whether a vehicle terminal of the vehicle is running out-of-date software; selecting a target vehicle among neighboring vehicles via wireless communication, wherein the target vehicle is running updated software; receiving a shared update file from the target vehicle via wireless communication, the shared update file based on the updated software; storing the shared update file; and updating the out-of-date software using the shared updated file.

As described above, according to the method of updating software for a vehicle of the present disclosure, the software of a vehicle can be easily updated without performing the processes of storing and transferring a file through a separated storage medium such as a USB memory or an SD card. Further, according to the present disclosure, since vehicle software can be updated through a vehicle-to-vehicle file sharing scheme, the costs of using wireless communication (e.g., 3G or LTE) data can be minimized. Further, the software can be updated by using a file sharing scheme through a low price communication module (e.g., Wi-Fi module) even in a vehicle having no costly telematics units (including a modem). In addition, according to the present disclosure, when the shared update files for software are distributed, as well as navigation software, the software can be easily updated through a vehicle-to-vehicle file sharing scheme.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
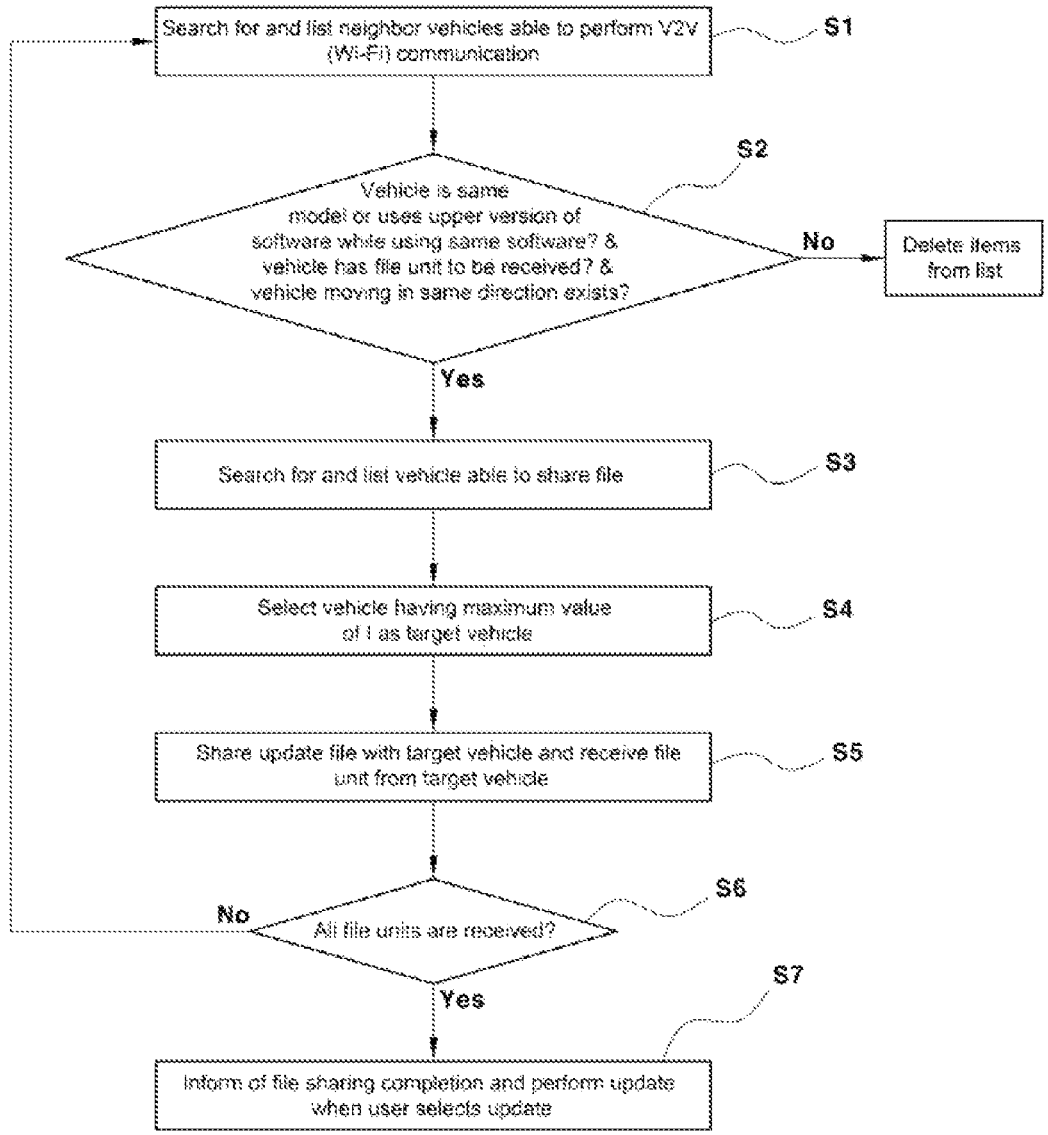
FIG. 1 is a flowchart showing an updating process according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, the present invention will be described in detail so that those skilled in the art to which the present disclosure pertains can easily carry out the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one vehicle terminal. The term "vehicle terminal" may refer to a hardware device that includes a memory and a processor. The memory is configured to store program instructions, and the processor is configured to execute the program instructions to perform one or more processes which are described further below.

Furthermore, the vehicle terminal of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN). The present disclosure provides a method of easily updating software of a telematics unit or a navigation device wirelessly communicable with external devices. Hereinafter, although a telematics unit is described as one example of a vehicle terminal, the present disclosure is not limited thereto. If a terminal of a vehicle enables wireless communication with an external device and is required to periodically update the software, it should be understood that the terminal is considered a target, the software of which is required to be updated. In addition, although the navigation software is described below as one example, the update software of the present disclosure is not limited to navigation software, and the navigation software and the shared update file described below may be replaced with all software and update files thereof.

Figure 2:
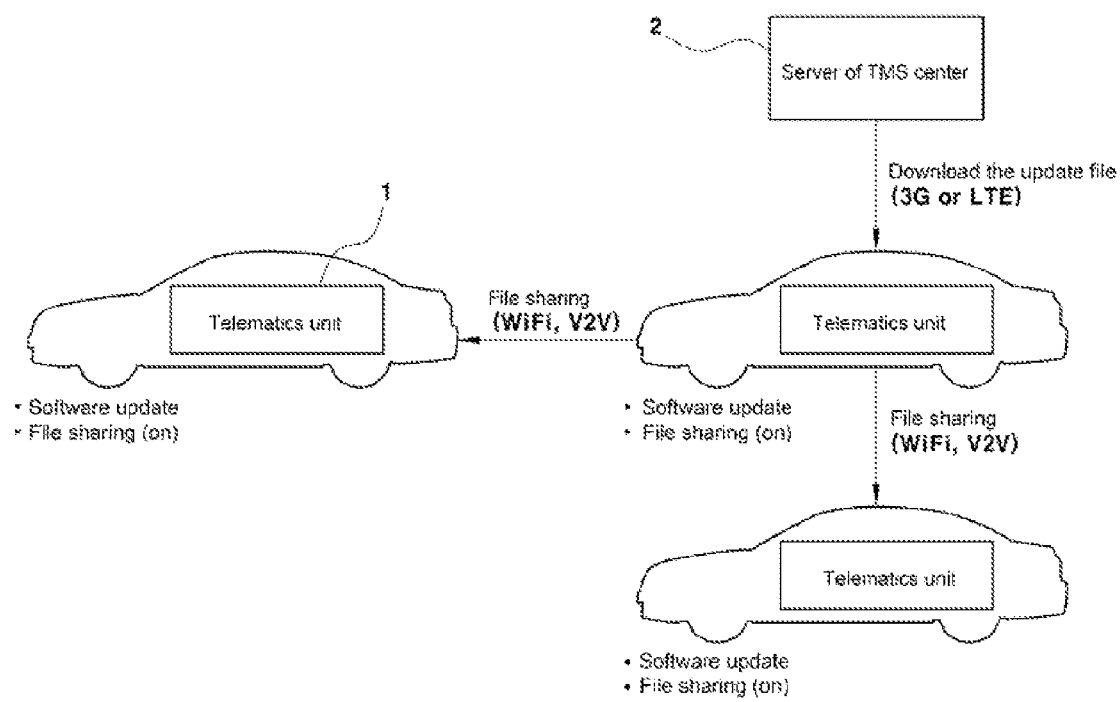
FIG. 2 is a view showing a system of performing an updating process according to an embodiment of the present disclosure.
Figure 3:
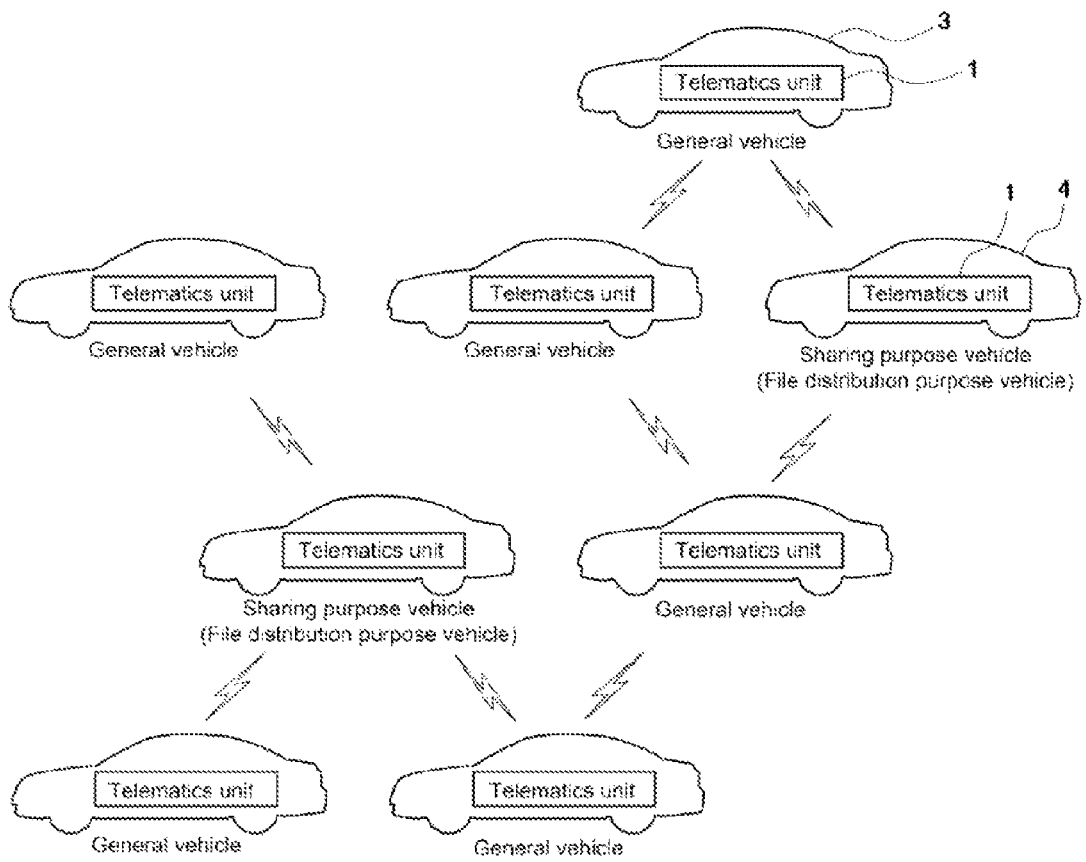
FIG. 3 is a view showing a method of updating and sharing a file between vehicles (V2V) according to an embodiment of the present disclosure.

FIG. 1 is a flowchart showing an updating process according to an embodiment of the present disclosure. FIG. 2 is a view showing a system of performing an updating process according to an embodiment of the present disclosure. FIG. 3 is a view showing a method of updating and sharing a file between vehicles (V2V) according to an embodiment of the present disclosure.

First, the present disclosure provides a scheme of sharing an update file and updating software by using the update file through broadcasting between vehicles without storing and transferring the update file through a separated storage medium. That is, the update file is shared between the vehicles to which vehicle terminals using the same software, for example, telematics units using the same navigation software, are installed, through wireless communication, so that one vehicle receives the update file shared with another vehicle to be updated. Therefore, the software update is performed using a vehicle-to-vehicle file transmission scheme.

Referring to FIG. 2, a file for updating navigation software is downloaded from an external server 2 to a specific vehicle having a telematics unit 1 through wireless communication. In this case, an external server 2 for providing a software update file may include a server of a provider which manufactures or provides navigation software, and a server (telematics center (TMS server)) of a provider which operates and provides a telematics service. In addition, the telematics unit 1 of a vehicle may receive an update file from the external server 2 through a mobile communication network, such as a 3G or LTE network, or similar mobile communication network. Then, the vehicle updates the navigation software of the telematics unit 1 with the update file received from the external server 2.

Next, the vehicle updated into a recent version of navigation software allows the received update file to be shared, so that the file sharing vehicle is maintained in the state that a file is enabled to be transmitted between vehicles through a vehicle-to-vehicle communication module of the telematics unit 1 installed to the vehicle. Meanwhile, the vehicle required to update the software of the telematics unit 1 (or vehicle terminal), for example, navigation software shares an upper version (or recent version) of software with a neighborhood vehicle which completes the update through telematics unit-to-telematics unit communication, so that the vehicle receives the update file transmitted from the neighborhood vehicle. A vehicle-to-vehicle (V2V) communication module for sharing or transmitting an update file between vehicles may include a Wi-Fi module.

As described above, the telematics unit 1 of the vehicle, which receives the shared update file from a neighborhood vehicle, updates the navigation software with the received update file. In this case, all vehicles, which use the same software and receive an updated version (e.g., a more current version) of an update file from another vehicle, perform the software updating operation, the vehicles which receive the update file and complete the software update operation, allow the update file to be shared such that another vehicle. After all, according to the vehicle-to-vehicle file sharing and updating scheme described above, the vehicle software may be updated automatically and more easily without taking the trouble to store and transfer a file through a separated storage medium by a vehicle driver.

Meanwhile, when the vehicle moves while a vehicle is receiving the upper version of an update file from another vehicle, such that the file reception is stopped, the vehicle continuously receives the update file from still another vehicle. The schemes of selecting a vehicle for downloading an update file and continuously downloading the update file will be described in more detail below.

First, the software update file can be divided into file units of N in order to continuously download the update file in consideration of mobility of the vehicle, and the divided update file can be stored and shared. Since the update file of navigation software including map data is typically a large-sized file, it is preferable to divide the update file into file units of N to store and share the update file. The file units from number 1 to number N are transmitted and received from a file sharing vehicle when the update file is shared. When the communication is broken while the file is being received, e.g., due to the movement of the vehicle, the number of the last received file unit is stored. Then, the vehicle performs the continuous download operation to receive the next file unit from a new vehicle selected from the neighboring vehicles having the file unit next to the stored file unit. When the vehicle receives all of the file units from 1 to N, the software update can be performed.

Describing the process of selecting a vehicle to share the update file, the vehicle desiring to perform the software update searches for the neighboring vehicles with which the update file is enabled to be shared. The vehicle allows a neighboring vehicle to be included in a list when the neighboring vehicle satisfies the following example requirements, as determined using V2V communication with the neighboring vehicle.

A) The vehicle is able to perform V2V communication through a communication module (e.g., Wi-Fi module), It may be possible to identify whether the vehicle is able to perform V2V communication through Wi-Fi AP search, for example.

B) The vehicle uses an updated version of software while having the same terminal model and software. It may be possible to identify whether the vehicle uses an updated version of software while having the same terminal model and software by sharing information through V2V communication, for example.

C) The vehicle allows the update file to be shared and has the file unit desired to be received. It may be possible to identify the vehicle by sharing information through V2V communication, for example.

D) The vehicle moves in the same direction (e.g., travelling direction). It may again be possible to identify the vehicle by sharing information through V2V communication, for example.

In addition, the vehicle may select a target vehicle, which is optimal to share the update file, among the neighboring vehicles considering the mobility of the vehicle. The vehicle may be set to select a vehicle which meets the following requirements, whereby it may be possible to ascertain whether a vehicle meets the requirements by sharing information with all neighboring vehicles through V2V communication, for example.

a) The vehicle has the greatest number of file units or the predetermined number of file units or more to be received.

b) The state of electric field of the vehicle is equal to or greater than a predetermined level so that the electric field state is capable of performing V2V communication (e.g., Wi-Fi communication).

c) The vehicle has an inter-vehicle distance less than a predetermined distance.

d) The vehicle has an inter-vehicle speed difference less than a predetermined difference.

In addition, a vehicle may be selected in consideration of all requirements that the vehicle has the greatest number of file units or the predetermined number of file units or more to be received, has an electric field which is good to perform V2V (e.g., Wi-Fi) communication, has a short inter-vehicle distance, and has a small inter-vehicle speed difference. It may be set to select a vehicle having the maximum value among the values which are calculated by weighting the number of file units to be received, an electric field, an inter-vehicle distance and an inter-vehicle speed difference. That is, a vehicle having the maximum value among I values of vehicles obtained from Equation 1, as follows, is selected as the target vehicle, from which the update file is received.

$$I = W_1 \times (n_T - n)/N + W_2 \times S_I/S_{max} - W_3 \times D_d/D_{max} - W_4 \times V_d/\max(V_T, V),$$ [Equation 1]

where $W_1$, $W_2$, $W_3$, and $W_4$ are preset weight factors. In this regard, since the sum of the weight factors is $W_1 + W_2 + W_3 + W_4 = 1$, the weight factors $W_1$, $W_2$, $W_3$, and $W_4$ may be set, for example, as $W_1 = 0.25$, $W_2 = 0.25$, $W_3 = 0.25$, and $W_4 = 0.25$.

In Equation 1, n is the number of file units stored in a target vehicle, and N is the number of entire file units (which is obtained by dividing a large size of an update file). $S_I$ is an Wi-Fi electric field intensity, $S_{max}$ is the maximum value of Wi-Fi electric field intensity, $D_d$ is an inter-vehicle distance, and $D_{max}$ is the maximum distance at which Wi-Fi communication is enabled. Further, $V_d$ is an inter-vehicle speed difference, $V_T$ is a speed of a target vehicle, V is a speed of the vehicle of the user, and max ($V_T$,V) is the highest value of two speeds $V_T$ and V.

Next, referring to the flowchart of FIG. 1 for the purpose of describing an updating process according to the present disclosure, in step S1, the telematics unit searches for neighboring vehicles able to perform V2V (e.g., Wi-Fi) communication (ascertaining requirement A)). It is determined in step S2 which vehicle meets the requirements of B) to D) through communication between the telematics units of the communicable neighboring vehicles. In step S2, the telematics unit of the vehicle determines whether to update software in such a manner that it is identified through V2V communication whether a neighboring vehicle using an updated version of software exists among the neighboring vehicles. In step S4, a target vehicle having the maximum value of I of Equation 1 is selected from the vehicles in the list. When the target vehicle is selected, the update file (or file units of the update file) is received from the target vehicle in step S5. When the communication link with the target vehicle is released while the update file is being received from the target vehicle, after the file units received until now are stored, the telematics unit again searches for target vehicles with which the update file is shared in order to repeat the step of selecting another vehicle (e.g., for continuous download). Thus, when another vehicle is selected, the next file units, which have not been received yet, are downloaded continuously.

Then, in step S6, when all of the file units constituting the update file are received, the reception completion state is displayed on the display part to inform a user of the reception completion, and the telematics unit inquires as to whether the update operation is performed through the display part in order to allow the user to select whether to update the software. Thus, if the user selects to perform the software update, the telematics unit updates the software using the received update file in step S7.

FIG. 3 is a view showing a method of sharing and updating a file between vehicles (V2V). As shown in FIG. 3, the software update may be performed the file share and transmission between vehicles. In such an update scheme, since there may not exist many vehicles 3 capable of sharing an update file of a new version of software early on after the new version of software has been released, a dedicated file sharing vehicle 4 may be operated in order to rapidly spread the update file and update the software of the vehicles through the file sharing between vehicles. The dedicated file sharing vehicle 4 may be driven for the purpose of distributing the update file of the software. When the dedicated file sharing vehicle 4 exists near a conventional vehicle 3, the conventional vehicle 3 receives the update file from the dedicated file sharing vehicle 4 through wireless communication (e.g., V2V communication). After the update is completed, when the number of vehicles 3 able to share a file is increased, all vehicles may receive the update file from the vehicle which has completed the file update, so that the software update may be rapidly completed.

As described above, according to the present disclosure, the software is able to be updated without performing the steps of storing and transferring the update file through a separated storage medium such as an USB memory or an SD card, and the software is able to be updated through the V2V file sharing scheme, so that the cost of using wireless communication (e.g., 3G or LTE) data can be minimized (the data communication fee may be charged to the vehicle which receives the file through the telematics center). Further, the software can be updated by using a file sharing scheme through a low price communication module (e.g., Wi-Fi module) even in a vehicle having no high price telematics units, including a modem. In addition, according to the present disclosure, when the update files (including software for solving a problem of a vehicle terminal) for large-sized software are distributed, as well as navigation software, the software can be easily updated through a vehicle-to-vehicle file sharing scheme without causing inconvenience.

Although the disclosed embodiments have been described in detail herein, the scope of the present disclosure is not limited to the description but various modifications made by those skilled in the art using the basic concept of the disclosed embodiments defined by the claims also fall within the scope of the present disclosure.

What is claimed is:

1. A method for updating out-of-date software of a source vehicle including a vehicle terminal, the method comprising:
   determining whether the vehicle terminal of the source vehicle is running out-of-date software;
   in response to determining that the vehicle terminal of the source vehicle is running out-of-date software, selecting, at the vehicle terminal of the source vehicle, a target vehicle among neighboring vehicles based on information indicating a number of file units to be received, an electric field intensity of wireless communication, an inter-vehicle distance, and an inter-vehicle speed difference, wherein the target vehicle is running updated software, and wherein the information is shared via wireless communication between vehicle terminals;
   receiving, at the vehicle terminal of the source vehicle, a shared update file from the target vehicle via wireless communication, wherein the shared update file is based on the updated software;
   storing, at the vehicle terminal of the source vehicle, the shared update file; and
   updating, at the vehicle terminal of the source vehicle, the out-of-date software using the shared update file, thereby completing a soft update of the out-of-date software running on the vehicle terminal of the source vehicle.

2. The method of claim 1, wherein, after the soft update is completed, the vehicle terminal of the source vehicle allows sharing of the shared update file via wireless communication, such that a vehicle terminal of another vehicle can wirelessly receive the shared update file in order to update out-of-date software running on the vehicle terminal of the other vehicle.

3. The method of claim 1, wherein the shared update file was obtained by a vehicle terminal of the target vehicle from an external server.

4. The method of claim 1, wherein in the selecting of the target vehicle, the vehicle terminal of the source vehicle identifies one or more vehicles of the neighboring vehicles using the updated software, moves in a same direction as the neighboring vehicles, allows sharing of the shared update file via vehicle-to-vehicle wireless communication, and selects a vehicle from the one or more identified vehicles as the target vehicle.

5. The method of claim 1, wherein the shared update file is divided into N file units.

6. The method of claim 5, wherein when a wireless communication link is established between the vehicle terminal of the source vehicle receiving the shared update file and the target vehicle while the shared update file is being received from the target vehicle, the vehicle terminal of the source vehicle receiving the shared update file selects a new target vehicle, receives remaining file units from the newly selected target vehicle, stores the remaining file units, and updates the out-of-date software when all of the remaining file units are received.

7. The method of claim 6, wherein in the selecting of the target vehicle, a maximum value among I values obtained from Equation 1 is selected from the target vehicle, and wherein Equation 1 is as follows:

$$I = W_1 \times (n_I - n)/N + W_2 \times S_I/S_{max} - W_3 \times D_d/D_{max} - W_4 \times V_d/\max(V_I, V),$$

wherein $W_1$, $W_2$, $W_3$, and $W_4$ are preset weight factors, $n_I$ is a number of file units stored in the target vehicle, n is a number of file units stored in a vehicle of a user, N is a number of all file units, $S_I$ is a Wi-Fi electric field intensity, $S_{max}$ is a maximum value of Wi-Fi electric field intensity, $D_d$ is an inter-vehicle distance, $D_{max}$ is a maximum distance at which Wi-Fi communication is enabled, $V_d$ is an inter-vehicle speed difference, $V_I$ is a speed of the target vehicle, V is a speed of the vehicle of the user, and $\max(V_I, V)$ is the highest value of two speeds $V_I$ and V.

8. The method of claim 1, wherein the vehicle terminal of the source vehicle is a telematics unit.

9. The method of claim 1, wherein the out-of-date software is navigation software.

10. The method of claim 1, wherein the wireless communication between vehicles is Wi-Fi communication.

11. The method of claim 1, wherein the target vehicle is a vehicle driven for the purpose of distributing the shared update file via wireless communication, such that a receiving vehicle can wirelessly receive the shared update file from the vehicle driven for the purpose of distributing the shared update file and update out-of-date software running on a vehicle terminal of the receiving vehicle using the received shared update file.

12. A vehicle terminal of a source vehicle, the vehicle terminal of the source vehicle being configured to perform a method for updating out-of-date software of the source vehicle, in which the vehicle terminal of the source vehicle is configured to:
- determine whether the vehicle terminal of the source vehicle is running out-of-date software;
- in response to determining that the vehicle terminal of the source vehicle is running out-of-date software, select a target vehicle among neighboring vehicles based on information indicating a number of file units to be received, an electric field intensity of wireless communication, an inter-vehicle distance, and an inter-vehicle speed difference, wherein the target vehicle is running updated software, and wherein the information is shared via wireless communication between vehicle terminals;
- receive a shared update file from the target vehicle via wireless communication, wherein the shared update file is based on the updated software;
- store the shared update file; and
- update the out-of-date software using the shared update file, thereby completing a soft update of the out-of-date software running on the vehicle terminal of the source vehicle.

13. A non-transitory computer readable medium containing program instructions for updating out-of-date software of a source vehicle including a vehicle terminal, the non-transitory computer readable medium comprising:

- program instructions that determine whether the vehicle terminal of the source vehicle is running out-of-date software;
- program instructions that, in response to determining that the vehicle terminal of the source vehicle is running out-of-date software, select, at the vehicle terminal of the source vehicle, a target vehicle among neighboring vehicles based on information indicating a number of file units to be received, an electric field intensity of wireless communication, an inter-vehicle distance, and an inter-vehicle speed difference, wherein the target vehicle is running updated software, and wherein the information is shared via wireless communication between vehicle terminals;
- program instructions that receive, at the vehicle terminal of the source vehicle, a shared update file from the target vehicle via wireless communication, wherein the shared update file is based on the updated software;
- program instructions that store, at the vehicle terminal of the source vehicle, the shared update file; and
- program instructions that update, at the vehicle terminal of the source vehicle, the out-of-date software using the shared update file, thereby completing a soft update of the out-of-date software running on the vehicle terminal of the source vehicle.

\* \* \* \* \*